US006433032B1

(12) United States Patent
Hamilton

(10) Patent No.: US 6,433,032 B1
(45) Date of Patent: *Aug. 13, 2002

(54) PROCESS FOR RIGID POLYURETHANE FOAMS

(75) Inventor: Alan James Hamilton, Leefdaal (BE)

(73) Assignee: Imperial Chemical Industries PLC, London (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/280,479

(22) Filed: Mar. 30, 1999

(30) Foreign Application Priority Data

Apr. 2, 1998 (EP) ............................................ 98106031

(51) Int. Cl.⁷ ............................ C08J 9/04; C08G 18/10; C08G 18/48; E04B 1/78; E04B 1/80
(52) U.S. Cl. ............................ 521/159; 428/69; 428/71; 428/76; 428/317.5; 428/318.4; 521/114; 521/115; 521/116; 521/117; 521/118; 521/128; 521/129; 521/130; 521/163; 521/164; 521/166; 521/167; 521/174; 521/176
(58) Field of Search .............................. 428/69, 71, 76, 428/317.5, 318.4; 521/114, 115, 116, 117, 118, 128, 129, 130, 159, 163, 164, 166, 167, 174, 176; 560/25, 26, 115, 158, 330

(56) References Cited

U.S. PATENT DOCUMENTS

| 3,294,713 | A |   | 12/1966 | Hudson et al. ............ 521/157 |
| 4,668,555 | A |   | 5/1987  | Uekado et al. ............. 428/69 |
| 5,350,777 | A |   | 9/1994  | Yuge et al. ............... 521/117 |
| 5,439,948 | A |   | 8/1995  | De Vos et al. ............. 521/159 |
| 5,457,138 | A |   | 10/1995 | Yuge et al. ............... 521/125 |
| 5,459,170 | A | * | 10/1995 | Bleys et al. .............. 521/125 |
| 5,578,656 | A | * | 11/1996 | Gillis et al. ............. 521/166 |
| 5,621,016 | A | * | 4/1997  | Murty et al. .............. 521/159 |
| 5,703,136 | A | * | 12/1997 | Gillis et al. ............. 521/128 |
| 5,840,782 | A | * | 11/1998 | Limerkens et al. ......... 521/174 |

FOREIGN PATENT DOCUMENTS

| EP | 745 627  | 12/1996 |
| GB | 902 548  | 8/1962  |
| WO | 93/08224 | 4/1993  |
| WO | 95/02620 | 1/1995  |

OTHER PUBLICATIONS

Oertel; *Polyurethane Handbook*: Chemistry—Raw Materials—Processing—Applications—Properties; Hanser Publishers; New York; 1985; pp. 235–236.*

* cited by examiner

*Primary Examiner*—Rabon Sergent
(74) *Attorney, Agent, or Firm*—Pillsbury Winthrop LLP

(57) ABSTRACT

Process for the preparation of open celled rigid polyurethane or urethane-modified polyisocyanurate foams by reaction of a polyfunctional isocyanate-reactive composition with a polyisocyanate composition comprising a prepolymer of NCO-value 21–30% based on a high molecular weight oxyethylene-containing polyol.

14 Claims, No Drawings

PROCESS FOR RIGID POLYURETHANE FOAMS

This invention relates to a process for the preparation of open-celled rigid polyurethane or urethane-modified polyisocyanurate foams, to foams prepared thereby, to the use of these foams in evacuated insulation panels and to certain novel polyisocyanate compositions useful in the process.

Rigid polyurethane and urethane-modified polyisocyanurate foams are in general prepared by reacting the appropriate polyisocyanate and polyol in the presence of a blowing agent. They can be open- or closed-celled.

One use of open-celled rigid polyurethane or urethane-modified polyisocyanurate foams is as a thermal insulation medium, for example, in evacuated insulation panels used in the construction of refrigerated storage devices.

Evacuated insulation panels generally comprise a low thermal conductivity filler material (such as open-celled polyurethane foam) and a vessel formed of a gastight film enveloping said filler, the whole being evacuated to an internal pressure of about 5 mbar or less and then hermetically sealed.

Open-celled polyurethane foams suitable as low thermal conductivity filler material for evacuated insulation panels can advantageously be produced by reacting an organic polyisocyanate with an isocyanate-reactive material comprising at least one isocyanate-reactive cyclic compound, as described in, for example, EP-A-498628, EP-A-498629, EP-A-419114, EP-A-662494, WO 95/15355, WO 95/02620, WO 96/25455, WO 96/32605, WO 96/36655, WO 98/54239 and GB 2324798, all incorporated herein by reference.

General descriptions of the construction of evacuated insulation panels and their use in thermal devices can be found in U.S. Pat. Nos. 5,066,437, 5,032,439 and 5,076,984 and European Patent Publications Nos 434266, 434225 and 181778, all incorporated herein by reference as well as the references mentioned therein.

EP 547515 describes a method for producing open cell rigid polyurethane foam for use in a vacuum insulating material by reacting polymethylene polyphenylisocyanate prepolymer with polyol at an NCO/OH equivalent ratio of 1.3 to 3.0 using water as blowing agent. The prepolymer is obtained by reacting polymethylene polyphenylisocyanate (p-MDI) with a polyol (oxypropylene based) and has an amine equivalent of 140 to 200 (which corresponds to an NCO value of 21 to 30%). The obtained open cell rigid polyurethane foam has a fine cell structure due to the presence of the p-MDI prepolymer and no scorching due to the index range employed.

EP 581191 describes a method for producing an open cell rigid polyurethane foam for use in vacuum insulating material by reacting a polyol with a polymethylene polyphenyl polyisocyanate prepolymer derived from a monol by use of a substitute for trichlorofluoromethane as blowing agent. The use of a prepolymer leads to a very fine cell structure of the contained foam.

The present Applicant has now developed an improved process for the preparation of open-celled rigid polyurethane and urethane-modified polyisocyanurate foams derived from certain polyisocyanate compositions comprising specific prepolymers (i.e. reaction products of a stoichiometric excess of a polyisocyanate and an isocyanate-reactive material).

Accordingly the invention provides a process for the preparation of an open-celled (semi-)rigid polyurethane or urethane-modified polyisocyanurate foam by reaction of a polyisocyanate composition with a polyfunctional isocyanate-reactive composition under foam-forming conditions, characterised in that the polyisocyanate composition has a free NCO-value of 21 to 30% by weight and comprises the reaction product of a stoichiometric excess of an organic polyisocyanate and an isocyanate-reactive material comprising a polyether polyol having a number average molecular weight between 1000 and 10000 and an average nominal hydroxyl functionality of from 2 to 6 and containing from 10 to 50% by weight of oxyethylene units.

The process of the invention is suitable for the preparation of open-celled rigid polyurethane or urethane-modified polyisocyanurate foams having improved cell-opening and finer cells. Closed cell contents of below 5% for the core of the foam are generally obtained by using the process of the present invention. Generally the closed cell content is below 2%, even more generally below 1%.

The open-celled foams according to the invention are characterised by excellent thermal insulation properties with no degradation of mechanical properties and are therefore particularly suitable for thermal insulation purposes.

Foam blocks at a thickness of greater than 30 cm and even greater than 45 cm can be prepared without scorching or splitting of the foam by using the process of the present invention.

Prepolymers of the claimed range of NCO values lead to lower exotherms within the foam thereby reducing the scorching of the foam and the tendency to split. Preferably the NCO value of the polyisocyanate composition is between 23 and 29 wt %, more preferably between 24 and 26 wt %.

The viscosity of the polyisocyanate composition is preferably below 2000 cps, more preferably below 1500 cps at 25° C. to allow easy processing.

The use of a polyfunctional isocyanate-reactive material to prepare the prepolymer is preferred over the use of a monofunctional isocyanate-reactive material. The use of prepolymers derived from monofunctional isocyanate-reactive material (such as a monohydric alcohol, preferably having a molecular weight of at least 340, for example a polyalkylene glycol monoalkyl ether of molecular weight 350 to 750) still leads to splitting of the foam especially in the production of thick foam blocks.

The isocyanate-reactive material which is reacted with a stoichiometric excess of an organic polyisocyanate to form the reaction product which is present in the polyisocyanate composition (hereinafter called the 'isocyanate-reactive material') is preferably a polyether polyol having a number average molecular weight between 1000 to 6000 and an average nominal hydroxyl functionality of from 2 to 4 and an oxyethylene content of between 10 and 50%. Preferably the polyether polyol has a molecular weight between 3000 and 5000, a functionality between 2.5 and 3.5 and an oxyethylene content of between 15 and 35%.

The term "average nominal hydroxyl functionality" is used herein to indicate the average functionality (number of hydroxyl groups per molecule) of the polyol composition on the assumption that this is the average functionality (number of active hydrogen atoms per molecule) of the initiator(s) used in their preparation although in practice it will often be somewhat less because of some terminal unsaturation.

Suitable polyether polyols for use in the isocyanate-reactive material have been fully described in the prior art and include reaction products of alkylene oxides, for example ethylene oxide and/or propylene oxide, with initiators containing from 2 to 6 active hydrogen atoms per molecule. Suitable initiators include water and polyols, for example ethylene glycol, propylene glycol, diethylene glycol, dipropylene glycol, cyclohexane dimethanol, resorcinol, bisphenol A, glycerol, trimethylolpropane, 1,2, 6-hexanetriol, triethanolamine, pentaerythritol and sorbitol; polyamines, for example ethylene diamine, tolylene diamine, diaminodiphenylmethane and polymethylene polyphenylene polyamines; and aminoalcohols, for example ethanolamine and diethanolamine, and mixtures of such initiators.

Preferred polyether polyols are poly(oxyethylene-oxypropylene) polyols containing preferably 10 to 50%, and more preferably 15 to 35% by weight, based on the total weight of the polyol, of oxyethylene groups.

Preferably, at least 50%, more preferably at least 75%, of these oxyethylene groups are present at the end of the polyether polyol.

If the oxyethylene content of the polyether polyol used in preparing the prepolymer is below 10 wt % the foam cell texture becomes coarse; if the oxyethylene content of the polyether polyol is above 50 wt % the closed cell content of the foam becomes too high.

In the preparation of the reaction product of the organic polyisocyanate and the isocyanate-reactive material it is preferred to react the organic polyisocyanate and the isocyanate-reactive material in such a ratio that the isocyanate-reactive material is present in the reaction product in an amount from 2 to 25%, and more preferably from 10 to 20%, by weight based on the total weight of the reaction product.

Organic polyisocyanates which may be used in the present invention include aliphatic, cycloaliphatic, araliphatic and aromatic polyisocyanates, but especially the polyisocyanates proposed in the literature for use in the production of foams. Of particular importance are aromatic diisocyanates such as tolylene and diphenylmethane diisocyanates in the well known pure, modified or crude forms. Special mention may be made of the so-called MDI variants (diphenylmethane diisocyanate modified by the introduction of urethane, allophanate, urea, biuret, carbodiimide, uretonimine or isocyanurate residues) and the mixtures of diphenylmethane diisocyanate(s) and oligomers thereof known in the art as "crude" or "polymeric" MDI (polymethylene polyphenylene polyisocyanates).

Polyfunctional isocyanate-reactive compositions with which the polyisocyanate composition may be reacted to form open-celled rigid polyurethane or urethane-modified polyisocyanurate foams include any of those known in the art for that purpose.

Of particular importance for the preparation of rigid foams are polyols and polyol mixtures having average hydroxyl numbers of from 300 to 1000, especially from 300 to 700 mg KOH/g, and hydroxyl functionality's of from 2 to 8, especially from 3 to 8. Suitable polyols have been fully described in the prior art and include reaction products of alkylene oxides, for example ethylene oxide and/or propylene oxide, with initiators containing from 2 to 8 active hydrogen atoms per molecule. Suitable initiators include: polyols, for example glycerol, trimethylolpropane, triethanolamine, pentaerythritol, sorbitol and sucrose; polyamines, for example ethylene diamine, tolylene diamine, diaminodiphenylmethane and polymethylene polyphenylene polyamines; and aminoalcohols, for example ethanolamine and diethanolamine, and mixtures of such initiators. Other suitable polymeric polyols include polyesters obtained by the condensation of appropriate proportions of glycols and higher functionality polyols with dicarboxylic or polycarboxylic acids. Still further suitable polymeric polyols include hydroxyl-terminated polythioethers, polyamides, polyesteramides, polycarbonates, polyacetals, polyolefins and polysiloxanes.

The quantities of the polyisocyanate compositions and the polyfunctional isocyanate-reactive compositions to be reacted will depend upon the nature of the rigid polyurethane or urethane-modified polyisocyanurate foam to be produced and will be readily determined by those skilled in the art.

The process of the invention may be carried out in the presence of any of the blowing agents known in the art for the preparation of rigid polyurethane or urethane-modified polyisocyanurate foams. Such blowing agents include water or other carbon dioxide-evolving compounds, such as isocyanate-reactive cyclic compounds, or inert low boiling compounds having a boiling point of above −70° C. at atmospheric pressure.

Suitable inert blowing agents include, for example, hydrocarbons, dialkyl ethers, alkyl alkanoates, aliphatic and cycloaliphatic hydrofluorocarbons, hydrochlorofluorocarbons, chlorofluorocarbons, and fluorine-containing ethers. Suitable hydrocarbon blowing agents include lower aliphatic or cyclic hydrocarbons such as n-pentane, isopentane, cyclopentane, neopentane, hexane and cyclohexane.

Where water is used as blowing agent, the amount may be selected in known manner to provide foams of the desired density, typical amounts being in the range from 0.05 to 5% by weight based on the total reaction ingredients, although it may be a particular embodiment of the present invention to incorporate up to 10% by weight or even up to 20% by weight of water.

The total quantity of blowing agent to be used in a reaction system for producing cellular polymeric materials will be readily determined by those skilled in the art, but will typically be from 2 to 25% by weight based on the total reaction system.

In order to further lower the thermal conductivity open celled rigid polyurethane foams having decreased cell sizes (in the range 50 to 150 micron) can be prepared. These fine-celled open-celled rigid polyurethane foams can be obtained by incorporating an insoluble fluorinated compound into the foam-forming mixture or by air-nucleation.

The term insoluble as used herein with reference to the insoluble fluorinated compound to be used in the preparation of these fine-celled open-celled rigid polyurethane foams is defined as showing a solubility in either the isocyanate-reactive composition or the polyisocyanate composition with which it is to be blended of less than 500 ppm by weight at 25° C. and atmospheric pressure.

Insoluble fluorinated compounds for use in the preparation of fine-celled open-celled rigid polyurethane foam include any of those disclosed in U.S. Pat. Nos. 4,981,897, 5,034,424, 4,972,002, EP-A-0508649, EP-A-0498628 and WO 95/18176, incorporated herein by reference.

The term substantially fluorinated as used herein with reference to the insoluble, substantially fluorinated compound to be used in the preparation of these fine-celled open-celled rigid polyurethane foams is to be understood to embrace compounds in which at least 50% of the hydrogen atoms of the unfluorinated compounds are replaced by fluorine.

Suitable compounds include substantially fluorinated or perfluorinated hydrocarbons, substantially fluorinated or perfluorinated ethers, substantially fluorinated or perfluorinated tertiary amines, substantially fluorinated or perfluorinated amino-ethers and substantially fluorinated or perfluorinated sulphones.

Preferred insoluble perfluorinated compounds include perfluoro-n-pentane, perfluoro-n-hexane, perfluoro N-methylmorpholine and perfluoro(4-methylpent-2-ene).

Certain insoluble fluorinated compounds suitable for use in the preparation of these fine-celled open-celled rigid polyurethane foams may themselves act as blowing agents under the conditions pertaining to the foam-forming reaction, particularly where their boiling point is lower than the exotherm temperature achieved by the reaction mixture. For the avoidance of doubt, such materials may, partly or completely, fulfil the function of blowing agent in addition to that of insoluble fluorinated compound.

The amount of the insoluble fluorinated compound to be used in the preparation of these fine-celled open-celled rigid polyurethane foams ranges from 0.05 to 10%, preferably from 0.1 to 5%, most preferably from 0.6 to 2.3% by weight based on the total foam-forming composition.

The insoluble fluorinated compound will usually be incorporated in the foam-forming reaction mixture in the form of an emulsion or preferably a microemulsion in one of the major components, that is to say in the isocyanate-reactive component and/or the polyisocyanate component. Such emulsions or microemulsions may be prepared using conventional techniques and suitable emulsifying agents.

Emulsifying agents suitable for preparing stable emulsions or microemulsions of fluorinated liquid compounds in organic polyisocyanates and/or isocyanate-reactive compounds include surfactants chosen from the group of nonionic, ionic (anionic or cationic) and amphoteric surfactants. Preferred surfactants are fluoro surfactants, silicone surfactants and/or alkoxylated alkanes.

The amount of emulsifying agent used is between 0.02 and 5 pbw per 100 pbw of foam-forming reaction system and between 0.05 and 10 pbw per 100 pbw of polyisocyanate or polyol composition.

In addition to the polyisocyanate and polyfunctional isocyanate-reactive compositions and the blowing agent, the foam-forming reaction mixture will commonly contain one or more other auxiliaries or additives conventional to formulations for the production of open-celled rigid polyurethane and urethane-modified polyisocyanurate foams. Such optional additives include crosslinking agents, for example low molecular weigh polyols such as triethanolamine, foam-stabilising agents or surfactants, for example siloxane-oxyalkylene copolymers, urethane catalysts, for example tin compounds such as stannous octoate or dibutyltin dilaurate or tertiary amines such as dimethylcyclohexylamine or triethylene diamine, fire retardants, for example halogenated alkyl phosphates such as tris chloropropyl phosphate or alkyl phosphonates, smoke suppressants, organic or inorganic fillers, thixotropic agents, dyes, pigments, mould release agents, cell opening agents such as inert particles, polymer particles (such as polymer polyols), specific surfactants, incompatible liquids such as solvents or polyols, inorganic fillers such as bentonite clays, silica particles (particularly fumed silica), metal flakes and stearates.

A particularly preferred process according to the present invention comprises the step of reacting the claimed organic polyisocyanate composition comprising the prepolymer with a polyfunctional isocyanate-reactive composition in the presence of an isocyanate-reactive cyclic compound of formula:

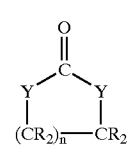

wherein
   Y is O or $NR^1$ wherein each $R^1$ independently is a lower alkyl radical of $C_1$–$C_6$ or a lower alkyl radical substituted with an isocyanate-reactive group;
   each R independently is hydrogen, a lower alkyl radical of $C_1$–$C_6$ or $(CH_2)_m$—X wherein X is an isocyanate-reactive group which is OH or $NH_2$ and
   m is 0, 1 or 2; and
   n is 1 or 2;
with the proviso that at least one of $R^1$ or R is or comprises an isocyanate-reactive group.

A preferred compound of formula (I) wherein Y is O is an isocyanate-reactive cyclic carbonate which is glycerol carbonate.

Preferred compounds of formula (I) wherein Y is $NR_1$ are isocyanate-reactive cyclic ureas of formula:

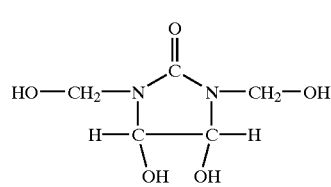

and

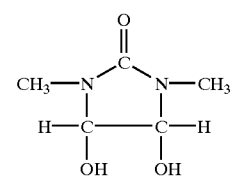

The isocyanate-reactive cyclic blowing promoter is used in amounts ranging from 0.1 to 99%, preferably from 0.5 to 60%, more preferably from 1 to 10% by weight based on the total isocyanate-reactive material.

The process is preferably carried out in the presence of a metal salt catalyst. Preferred metal salt catalysts are those selected among group Ia and group IIa metal salts, more preferably among group Ia and group IIa metal carboxylates. Particularly suitable metal salt catalysts are potassium acetate and potassium ethylhexoate (for example, Catalyst LB available from Imperial Chemical Industries).

The metal salt is used in amounts ranging from 0.01 to 3% by weight based on the total reaction system.

Alternatively aminoalcohol catalysts can be used in the above process as described in WO 98/54239, incorporated herein by reference. A preferred aminoalcohol catalyst is 2-(2-dimethylaminoethoxy)ethanol. The aminoalcohol catalyst is generally used in amounts varying between 0.1 and 3% by weight based on total reaction system.

Amine catalysts can be used together with the metal salt catalyst or the aminoalcohol catalyst described above. Examples of suitable tertiary amine catalysts include dimethylcyclohexylamine, bis(dimethylaminoethyl)ether, tetramethylhexanediamine, triethylenediamine, N-methylmorpholine, pentamethyldiethylenetriamine, tetramethylethylenediamine, 1-methyl-4-dimethylaminoethylpiperazine, 3-methoxy-N-dimethylpropylamine, N-ethylmorpholine, diethylethanolamine, N-cocomorpholine, N,N-dimethylyl-N',N'-dimethyl isopropylpropylenediamine, N,N-diethyl-3-diethylaminopropylamine, dimethylbenzylamine. The amine catalyst is used in amounts ranging from 0.1 to 1.5% by weight based on the total foam.

In order to decrease the closed cell content particularly in conditions of overpack as during the filling of a refrigerator cavity a supplemental cell opening agent selected from the group consisting of fatty acids, fatty acid amines, fatty acid amides and fatty acid esters can be used as described in GB 2324798, incorporated herein by reference. Examples of suitable fatty acid derivative cell opening agents include tallow diamines (which are complex mixtures of $C_{16}$–$C_{30}$ diamines), mixtures of tallow diamines with fatty acid esters such as the commercially available products INT 494/792/0, 494/792/1, 494/792/2 and 494/792/4 available from Munch Chemie-Labor and the following fatty acid diamines $C_{19}H_{38}(NH_2)_2$, $C_{23}H_{46}(NH_2)_2$ and $C_{22}H_{50}(NH_2)_2$. These fatty acid based additional cell opening agents are used in amounts of between 0.1 and 20% by weight, preferably between 0.5 and 5% by weight and most preferably between 0.5 and 2% by weight based on the foam.

Further useful additives for use in the above described process include polyethylene glycols containing from 1 to 10 ethyleneoxy units, antioxidants such as Irganox 1135, Irganox 1010 and Irzafos TNPP, additional silicone-based cell opening agents such as Ortagol 501 and Tegostab B8919 (both available from Goldschmidt), Additive 6164 (available from OSI) and silicones of the DC-200 series (available from Dow Corning).

Isocyanate indices of from 70 to 140 will typically be used in operating the method of the present invention but lower indices may be used if desired. Higher indices, for example 150 to 500 or even up to 3000, may be used in conjunction with trimerisation catalysts to make foams containing isocyanurate linkages. Preferred indices lie in the range 90 to 250, more preferably 100 to 120.

In operating the process for making rigid foams according to the invention, the known one-shot, prepolymer or semi-prepolymer techniques may be used together with conventional mixing methods and the rigid foam may be produced in the form of slabstock, mouldings, cavity fillings, sprayed foam, frothed foam or laminates with other materials such as hardboard, plasterboard, plastics, paper or metals.

Open-celled rigid polyurethane foams prepared in accordance with the process of the invention are characterised by having open cells (closed cell content below 1%) and are of particular use for evacuated insulation panel applications where they show superior thermal insulation properties. Further outgassing (i.e. gases such as air, water vapour or blowing agent diffusing gradually from closed cell portions) of an open-celled rigid polyurethane foam of the present invention is decreased compared to foams with higher closed cell content and thus internal pressure increase with lapse of time of evacuated insulation panels filled with the present foams is decreased leading to improved thermal insulation. Further the time needed to evacuate a panel to the desired pressure level is decreased owing to the lower closed cell content of the present foam.

Preferably the open-celled rigid polyurethane foam of the present invention is preconditioned prior to placement in the gastight envelope. This preconditioning involves heating and agitating the filler material preferably under reduced pressure in order to remove contaminants.

To improve the performance of the evacuated insulation panel, materials are provided within the sealed panels to absorb or otherwise interact with gases and vapours that remain due to imperfect evacuation, that permeate the enclosure from the outside atmosphere or evolve from the polyurethane foam filler itself. Such materials are known as getters and may include, for example, activated carbon, molecular sieves and zeolites to adsorb volatiles evolving from the polyurethane foam filler.

The above described polyisocyanate composition can also be used in a process for making closed celled rigid polyurethane or urethane-modified polyisocyanurate foam such as the foam used to encapsulate an evacuated insulation panels within the cavity of a refrigerator.

The invention is illustrated but not limited by the following examples in which all parts, percentages and ratios are by weight.

The following glossary of materials is included to identify reaction components not otherwise identified in the examples.

GLOSSARY

Polyol A is a sorbitol-initiated polyether polyol of OH value 500 mg KOH/g.
Polyol B is a sorbitol-initiated polyether polyol of OH value 350 mg KOH/g.
PEG 200 is polyethylene glycol of molecular weight 200.
Surfactant is a siloxane-based surfactant.
IMR 494/792/2 is a cell-opening agent available from Munch Chemie.
Cell opening agent is a silicone-based cell-opening agent.
Blow catalyst is an amine-based catalyst.
DMAEE is a catalyst available from Huntsman Chemicals under the tradename ZR 70.
Fixapret NF is a cyclic urea available from BASF.
Additive is a scorch-preventing compound.

EXAMPLES

Rigid open celled polyurethane foams were made from an isocyanate-reactive composition containing the ingredients listed in table 1 below and a polyisocyanate composition containing a prepolymer prepared by reacting polymeric MDI with a polyol as identified in table 2 below (NCO value of prepolymer, molecular weight, functionality, oxyethylene content of the polyol). The two compositions were reacted at a NCO index of 110. The closed cell content (CCC in %) of the obtained foams was measured using a Micromeretic Accupyc 1330 Closed Cell Measuring. The foam cell size was also evaluated. The results are listed in table 2 below. As a reference example a foam was made using polymeric MDI instead of a prepolymer as polyisocyanate.

These results show that using a prepolymer derived from a polyether polyol with a very low EO content leads to coarse cell texture (examples 6 to 8) whereas using prepolymers derived from a polyether polyol with high EO content leads to a higher closed cell content (examples 11 and 12).

TABLE 1

| | |
|---|---|
| Polyol A | 24 |
| Polyol B | 60 |
| PEG 200 | 10 |

TABLE 1-continued

| Surfactant | 1 |
|---|---|
| IMR 494/792/2 | 1 |
| Cell opening agent | 0.5 |
| Blow catalyst | 0.05 |
| DMAEE | 1.2 |
| Fixapret NF | 2.8 |
| Additive | 1 |

TABLE 2

| Example | NCO prepolymer | MW polyol | Funct. Polyol | EO content polyol | CCC (%) | Cell size |
|---|---|---|---|---|---|---|
| Ref. | 30.8 | | | | 80 | Fine |
| 1 | 28.5 | 4500 | 2 | 27 | 0.6 | Very fine |
| 2 | 26.9 | 6000 | 3 | 16 | 0.3 | Very fine |
| 3 | 23.5 | 650 | 6 | 0 | 76 | Fine |
| 4 | 28.5 | 500 | 3 | 0 | 1.2 | Coarse |
| 5 | 28.7 | 500 | 3 | 50 | 30 | Slightly coarse |
| 6 | 27.5 | 1000 | 3 | 0 | 0.6 | Coarse |
| 7 | 24.5 | 3500 | 3 | 0 | 0.4 | Coarse |
| 8 | 24.5 | 3500 | 3 | 10 | 0.2 | Slightly coarse |
| 9 | 24.8 | 3500 | 3 | 16 | 0.5 | Fine |
| 10 | 25 | 3500 | 3 | 25 | 0.3 | Very fine |
| 11 | 23.9 | 3500 | 3 | 50 | 10 | Very fine |
| 12 | 28.4 | 1000 | 3 | 50 | 8 | Fine |

What is claimed is:

1. Process for the preparation of an open-celled rigid polyurethane or urethane-modified polyisocyanurate foam comprising:
   reacting a polyisocyanate composition with a polyfunctional isocyanate-reactive composition under foam-forming conditions,
   wherein the polyisocyanate composition has a free NCO-value of 21 to 30% by weight and comprises the reaction product of
   a stoichiometric excess of an organic polyisocyanate and
   an isocyanate-reactive material comprising a polyether polyol having a molecular weight between 1000 and 10000 and an average nominal hydroxyl functionality of from 2 to 6 and containing from 10 to 50% by weight of oxyethylene units.

2. Process according to claim 1 wherein the free NCO-value of the polyisocyanate composition is between 23 and 29 wt %.

3. Process according to claim 2 wherein the free NCO-value of the polyisocyanate composition is between 24 and 26 wt %.

4. Process according to claim 1 wherein the polyether polyol has a number average molecular weight between 1000 and 6000.

5. Process according to claim 1 wherein the polyether polyol has an average nominal hydroxyl functionality of from 2 to 4.

6. Process according to claim 1 wherein the polyether polyol has an oxyethylene content of between 15 and 35% by weight.

7. Process according to claim 1 wherein the polyether polyol is a poly(oxyethylene-oxypropylene) polyol.

8. Process according to claim 1 wherein at least 50% of the oxyethylene groups are present at the end of the polyether polyol.

9. Process according to claim 1 wherein the isocyanate-reactive material in the reaction product is used in an amount from 2 to 25% by weight based on the reaction product.

10. Process according to claim 1 wherein the organic polyisocyanate is polymethylene polyphenylene polyisocyanate.

11. Process according to claim 1 carried out in the presence of an isocyanate-reactive cyclic compound corresponding to the formula:

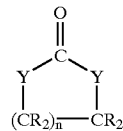

(I)

wherein
   Y is O or NR$^1$ wherein each R$^1$ independently is a lower alkyl radical of $C_1$–$C_6$ or a lower alkyl radical substituted with an isocyanate-reactive group; each R independently is hydrogen, a lower alkyl radical of $C_1$–$C_6$ or $(CH_2)_m$—X wherein X is an isocyanate-reactive group which is OH or $NH_2$ and m is 0, 1 or 2;
   and n is 1 or 2; with the proviso that at least one of R$^1$ or R is or comprises an isocyanate-reactive group.

12. Process according to claim 11 wherein the isocyanate-reactive cyclic compound corresponds to the formula (II) or (III):

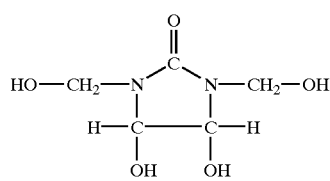

(II)

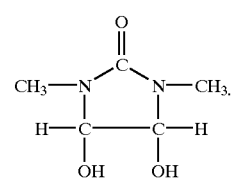

(III)

13. Rigid open-celled polyurethane or urethane-modified polyisocyanurate foam obtained by a process as defined in claim 1.

14. Evacuated insulation panel comprising a filler material and vessel formed of a gastight film enveloping said filler, wherein said filler material comprises a rigid open-celled polyurethane or urethane-modified polyisocyanurate foam as defined in claim 13.

* * * * *